United States Patent
Ho et al.

(10) Patent No.: US 12,200,017 B2
(45) Date of Patent: Jan. 14, 2025

(54) TECHNIQUES FOR AUTOMATED CAPTURE AND REPORTING OF USER-VERIFICATION METRIC DATA

(71) Applicant: PayPal, Inc., San Jose, CA (US)

(72) Inventors: Chun Kiat Ho, Singapore (SG); Kim Dung Bui, Singapore (SG); Jesslyn Sze Yu Chew, Singapore (SG); Bipin Kesapur, Singapore (SG)

(73) Assignee: PayPal, Inc., San Jose, CA (US)

( * ) Notice: Subject to any disclaimer, the term of this patent is extended or adjusted under 35 U.S.C. 154(b) by 372 days.

(21) Appl. No.: 17/558,326

(22) Filed: Dec. 21, 2021

(65) Prior Publication Data

US 2023/0199028 A1   Jun. 22, 2023

(51) Int. Cl.
  *H04L 9/40* (2022.01)
  *G06F 16/21* (2019.01)
  *G06F 16/2458* (2019.01)
  *G06Q 20/40* (2012.01)

(52) U.S. Cl.
  CPC ............ *H04L 63/20* (2013.01); *G06F 16/213* (2019.01); *G06F 16/2458* (2019.01); *G06Q 20/4014* (2013.01)

(58) Field of Classification Search
  CPC .. G06F 16/178; G06F 16/164; G06F 16/1734; G06F 16/184; G06F 16/2458; G06F 16/213; H04L 63/20; G06Q 20/4014
  See application file for complete search history.

(56) References Cited

U.S. PATENT DOCUMENTS

| | | | |
|---|---|---|---|
| 9,245,291 B1 * | 1/2016 | Ballaro | G06Q 30/0635 |
| 9,798,524 B1 * | 10/2017 | Colton | G06F 16/972 |
| 2016/0191415 A1 * | 6/2016 | Reddy | H04L 41/0893 |
| | | | 709/226 |

OTHER PUBLICATIONS

"ANTLR," Wikipedia; https://en.wikipedia.org/w/index.php?title=ANTLR&oldid=1049805911; last edited on Oct. 13, 2021; 5 pages.
"Know your customer," Wikipedia; https://en.wikipedia.org/w/index.php?title=Know_your_customer&oldid=1057273804; last edited on Nov. 26, 2021; 5 pages.

\* cited by examiner

*Primary Examiner* — Hosain T Alam
*Assistant Examiner* — Anthony G Gemignani
(74) *Attorney, Agent, or Firm* — Kowert, Hood, Munyon, Rankin & Goetzel, P.C.; Scott W. Pape; Dean M. Munyon

(57) ABSTRACT

Techniques are disclosed relating to the automated capture and reporting of user-verification metric data. In various embodiments, a server system may maintain a set of user-verification rules usable to verify an identity of a user requesting to perform operations via a service provided by the server system. In response to receiving an updated rule definition for a particular user-verification rule, the server system may automatically generate an updated schema for the particular user-verification rule, where the updated schema specifies a structure of event messages used to documents uses of the particular user-verification rule by a user-verification service. The server system may then receive information corresponding to a particular use of the particular user-verification rule and, using the updated schema, generate an event message to document the particular use of the particular user-verification rule.

20 Claims, 10 Drawing Sheets

450

*Machine-Usable Version of Rule 122A*

```
rule "US-policy-1": {
    metadata: {
        "id": "8f5e8ab5-2ee3-4bea-a078-e8a374a553cb",
        "priority": 1,
        "createdAt": "1634173886",
        "updatedAt": "1634174703",
        "description": "US CIP policy for personal account"
    }
    if:
        (jurisdiction == "US") and (limit == "1000") and
        (currency == "USD") and (duration >= "30 days")
        and ((action == "send") or (action == "receive"))
    then:
        block: all_of(transaction.action)
        require: {
            user_identity: [name, dob, address]
        }
}
```

FIG. 4B

TECHNIQUES FOR AUTOMATED CAPTURE AND REPORTING OF USER-VERIFICATION METRIC DATA

BACKGROUND

Technical Field

This disclosure relates generally to user verification, and more particularly to techniques for the automated capture and reporting of user-verification metric data.

Description of the Related Art

Server computer systems, such as web servers, application servers, email servers, etc., may provide various computing resources and services to an end user. For example, a web service may use a computer system to provide access to software applications to remote users via a network. In many instances, it is desirable for the service provider to use user-verification rules to obtain identifying information about the users of its service. Accordingly, a server system may implement a user-verification service to monitor and report computed metrics regarding the user-verification rules, such as the verification fail-rate per country, highest fail rate, highest fail rate by rule type, etc.

Usage metrics indicative of the performance of the user-verification rules may be difficult to monitor, particularly for server systems that provide services to many users (e.g., millions) located in different geographic regions. For example, implementing a new user-verification rule is often a time- and labor-intensive task that may take an extended time period (e.g., weeks) to complete. This, in turn, may result in increased costs and delay in implementing the new user-verification rules, resulting in the loss of relevant user-verification metric data during that time period and degrading the quality of the user-verification service.

BRIEF DESCRIPTION OF THE DRAWINGS

FIG. 4B is a block diagram depicting a non-limiting example of a user-verification rule specified in a format usable by a user-verification service, according to some embodiments.

DETAILED DESCRIPTION

Figure 1:
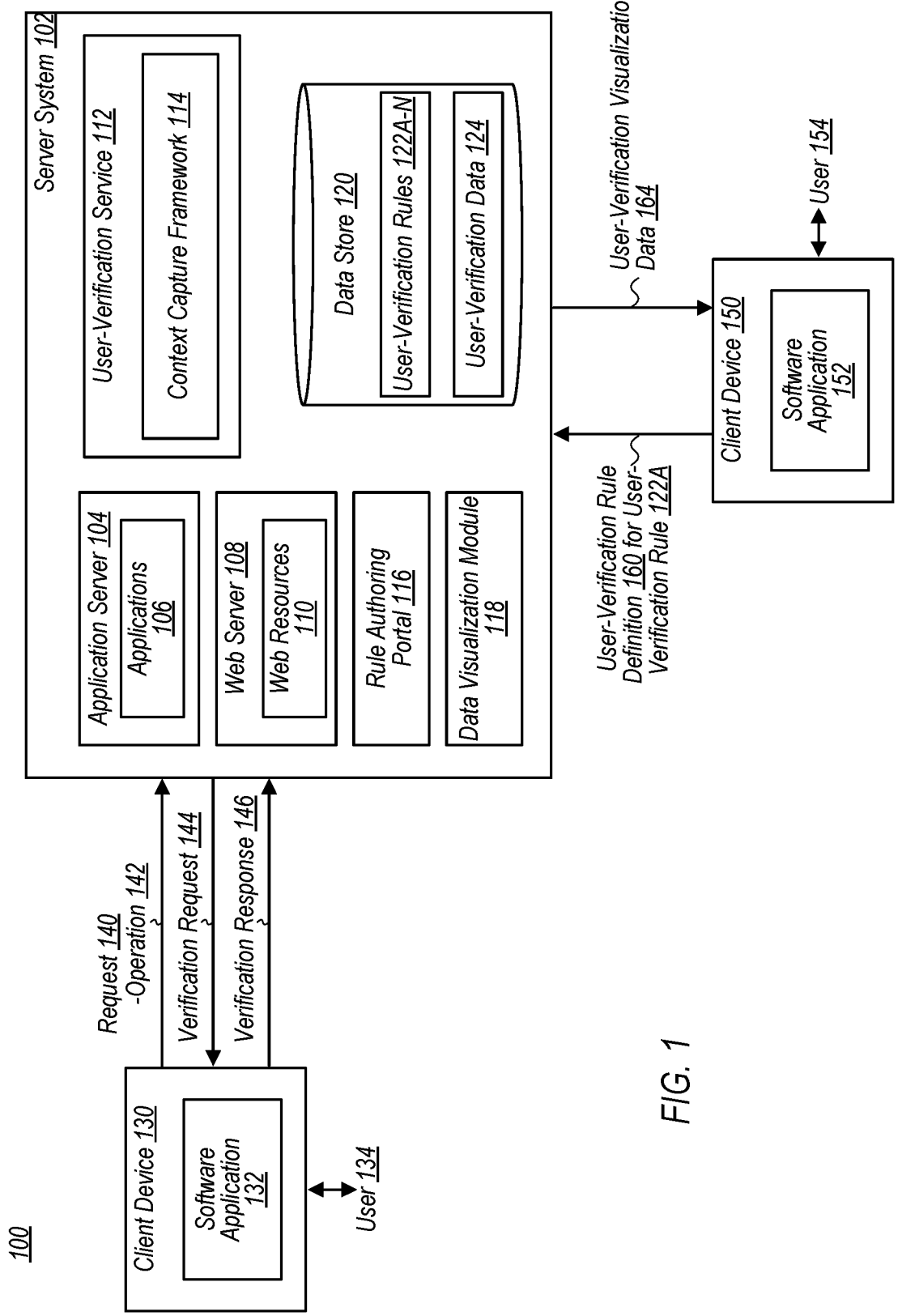
FIG. 1 is a block diagram illustrating an example server system implementing a user-verification service, according to some embodiments.

A server system may provide various web services in which the computing resources of the server system (including hardware or software elements of the server system) perform computing operations on behalf of a requesting entity. Non-limiting examples of web services a server system may provide include email services, streaming media services, map-based services, online payment services, retail services, etc. In many instances, it is desirable for the service provider to obtain and maintain identifying information about the users of its service. Consider, as a non-limiting example, the case of global "know your client" ("KYC") requirements, which are designed to identify and prevent fraud and money-laundering, particularly in an effort to counter the financing of terrorism. Typically, KYC regulations require service providers in various industries (e.g., banking, financial services providers, insurers, and various non-financial industries) to determine and verify their users' identity during and over the course of use of the service(s). In many instances, service providers are required to monitor and report (e.g., to regulatory bodies, internal stakeholders, etc.) computed metrics regarding the user-verification requirements, such as the verification fail-rate per country, highest limitation rate, highest limitation rate by limitation type, etc. (Note that, although described in the context of KYC, the disclosed techniques may be utilized by service providers in any suitable industry or context.)

Verifying the identities of the users of a system, and reporting the user-verification metrics for these users, presents various technical problems for a service provider, particularly in instances in which the service has many users (e.g., millions of users) in multiple different geographic regions (e.g., in different states, countries, etc.). Continuing with the non-limiting example introduced above, KYC requirements may be implemented by different laws in different countries such that, if a service provider has users that reside in ten different countries, the service provider is (potentially) required to comply with ten different KYC laws. Compounding this problem, the specific user-identification requirements may vary by country, by industry, by computing operation that triggers the user-identification process, etc. Consider a non-limiting example in which a provider of an online payment service has users located in Country A and Country B, both of which have different KYC laws that apply to the service provider for users that reside in their respective countries. In some instances, the requirements for these different KYC laws may be the same (e.g., when a user creates a user account, obtain the user's first name, last name, and date of birth). In other instances, however, these different KYC laws may differ in one or more ways (e.g., different triggering events, different user-identification requirements, etc.). Note, however, that, in some instances, the user-verification requirements used by a service provider may vary across different geographic regions regardless of the underlying KYC laws (e.g., due to internal policies). Further note that, in various instances, the user-verification rules implemented by a service provider may be subject to change over time across one or more of the jurisdictions in which it operates (e.g., due to changes in the underlying KYC laws, internal policy changes, etc.).

Unlike infrastructure usage metrics of the server system (e.g., memory usage, CPU usage, API monitoring, etc.), which may be monitored using standard industry solutions (e.g., SignalFX), user-verification rules (e.g., global KYC rule) metrics are difficult to monitor. For example, using prior techniques, whenever there is a new user-verification rule (e.g., due to a new or updated KYC rule), software engineers for the service provider typically have to make ad-hoc changes to the end-to-end system, which is often a time- and labor-intensive task that may take weeks or months to complete. This results in increased costs and delay in implementing the new user-verification rules and the resulting loss in relevant user-verification metric data during that time period, degrading the quality of the user-verification service and the server system as a whole. Additionally, such an approach would operate only on a "go-forward basis" such that the system would not be able to look back at what the metrics would have been during a time period (e.g., 6 months) prior to the new user-verification rule being introduced.

As described in detail below, however, various disclosed embodiments address these technical problems by providing a user-verification rule platform that allows a service provider to automate the generation of user-verification rules, updated schema used to document uses of those user-verification rules, and queries usable to retrieve user-verification metric data to evaluate the performance of the user-verification rules across different sets of users, requested operations, geographic regions, etc. This, in turn, may reduce the time and manual effort required to implement a new user-verification rule into a user-verification service while improving the quality and reporting of the metric data corresponding to the use of those user-verification rules.

Referring now to FIG. 1, block diagram 100 depicts a server system 102 that includes application server 104 hosting one or more software applications 106, web server 108 hosting one or more web resources 110, and user-verification service 112. In various embodiments, user-verification service 112 is operable to verify the identity of an end user as that user attempts to perform various computing operations via the server system 102. For example, in various embodiments, server system 102 provides one or more computing resources (e.g., using software applications 106 and web resources 110 as part of a web service) that may be used directly by end users or that may be integrated with (or otherwise used by) web services provided by third parties. As one non-limiting example, server system 102, in some embodiments, provides an online payment service that may be used by end users to perform online financial transactions (e.g., sending or receiving funds) or utilized by merchants to receive funds from customers during financial transactions. Note, however, that this embodiment is described merely as one non-limiting example. In other embodiments, server system 102 may provide any of various suitable web services to end users, such as an email service, streaming media service, online retail store, etc. Additionally note that, in some embodiments, a "server system" (e.g., server system 102, application server 104, or web server 108) may be implemented using a single machine. In other embodiments, however, a "server system" may be implemented using multiple machines executing (e.g., at one or more datacenters) for the benefit of a single entity. For example, in some embodiments, one or more of server system 102, application server 104, or web server 108 may be implemented using multiple machines located at one or more (potentially remote) datacenters.

FIG. 1 further includes client device 130 operated by user 134. Client device 130 may be any of various suitable computing devices, such as a smartphone, laptop computer, desktop computer, tablet computer, etc. that user 134 uses to access the service(s) provided via server system 102. For example, in various embodiments, client device 130 executes a software application 132, such as a web browser or dedicated software application, usable to access one or more computing resources provided by server system 102.

In the depicted embodiment, user 134 sends, via client device 130, a request 140 to the server system 102 to perform an operation 142. For example, in various embodiments the server system 102 is operable to perform various different types of operations for a request user as part of the service(s) it provides. In the non-limiting embodiment in which the server system 102 provides an online payment service, these operations may include creating a user account, adding a credit card or bank account as a funding source, logging into a user account, modifying a user's account information, transferring funds from one user account to another, etc. Note again, however, that this embodiment is provided merely as one non-limiting example and, in other embodiments, server system 102 is operable to provide any suitable set of operations as part of the service(s) it provides.

In various embodiments, in response to the request 140 to perform an operation 142, the user-verification service 112 may utilize one or more user-verification rules 122 (or simply "rules 122") to verify the identity of the user 134 requesting the operation 142. For example, in various embodiments the user-verification service 112 is operable to monitor the activity of the services provided by the server system 102 to determine whether any of the various user-verification rules 122 apply for a given request. That is, the user-verification service 112 may evaluate the request 140 to determine (for example based on the particular operation 142 requested, identity of the user 134, or any other characteristic of the request 140) whether any of the user-verification rules 122 have been triggered. If the request 140 does trigger a particular user-verification rule 122, such as user-verification rule 122A, the user-verification service 112 may apply the user-verification rule 122A to verify the identity of the user 134. Note that, in some embodiments, the user-verification service 112 may be included as part of an internal KYC service implemented by the server system 102 to ensure compliance with various KYC requirements imposed on the service provider in the various jurisdictions in which it operates. In some such embodiments, the user-verification rules 122 may be KYC rules. This embodiment is provided merely as one non-limiting example, however, and in other embodiments the user-verification service 112 may be implemented independent of any KYC or other regulations.

User-verification rules 122 are described in more detail below with reference to FIGS. 4A-4B. For the purposes of the present discussion, however, note that, in various embodiments, a user-verification rule 122 is associated with a particular type of operation (also referred to herein as a "capability") performable via the server system 102, includes a "triggering condition" (e.g., one or more conditions that define when the rule 122 is to be applied), and a user-verification requirement that is to be met by a user to satisfy the rule 122. Continuing with the non-limiting example above in which the server system 102 provides an online payment service, user-verification rule 122A may provide that, when a user in the U.S. attempts to transfer more than $1000 USD, the user must provide one or more items of identifying information (e.g., first and last name, date of birth, and residence address) to be verified by the user-verification service 112. In the embodiment depicted in FIG. 1, for example, in response to determining that request 140 triggers user-verification rule 122A, the user-verification service 112 may send a verification request 144 to the client device 130 requesting the user 134 to provide one or more items of identifying information. The user 134 may include this requested information in the verification response 146 sent by the client device 130 to the server system 102, which may be verified by the user-verification service 112. (Note that if the requested information has already been provided by the user 134 during the course of a session with the server system 102, in various embodiments the user-verification service 112 may simply compile that identification information without requesting it from the user 134 again.) If the identifying information provided by the user 134 (or a malicious user posing as user 134) does not match that previously provided by the user 134, the server system 102 may take one or more additional actions, such as denying the request 140, performing further risk analysis, requesting additional authentication operations (e.g., multi-factor authentication) from the user 134, etc. If, however, the user 134 is verified based on the identifying information included in the verification response 146, the server system 102 may perform the requested operation 142 for the user 134.

As described above, in various embodiments the server system 102 may have many (e.g., hundreds, thousands, etc.) of user-verification rules 122 to be used across the various different geographic regions in which the server system 102 operates. Further, in many instances, new user-verification rules 122 may be added and existing user-verification rules 122 may be retired or modified over time. Using prior techniques, the process of creating or updating a user-verification rule 122 is a slow, manual process, requiring an extended period of time to add or update a user-verification rule 122 for use by the user-verification service 112 and updating the associated reporting mechanism so that the uses of that user-verification rule 122 may be monitored and the associated metrics reported. In various embodiments, however, the disclosed techniques may overcome the shortcomings of the prior approaches, thereby reducing the latency and the amount of manual effort required to implement new user-verification rules 122 (or to change existing user-verification rules 122) while also improving the ability of the system to capture and report relevant contextual information relating to the usage of the new or updated user-verification rules 122.

For example, in the embodiment of FIG. 1, the server system 102 includes a rule authoring portal 116 ("RAP 116") that, in various embodiments, is operable to receive user-verification rule definition 160 (or simply "definition 160") for a user-verification rule 122, e.g., rule 122A, from a user 154 of a client device 150. In some embodiments, for example, the user 154 may be a user associated with the service provider that operates server system 102 (rather than an end user of the service(s) provided by the server system 102) who is responsible for using the RAP 116 to create new, or update existing, user-verification rules 122, e.g., based on a change in the applicable KYC regulations. RAP 116 is described in more detail below with reference to FIGS. 2 and 4A. Note, however, that in various embodiments the RAP 116 is operable to provide an interface through which the user 154 may provide the user-verification rule definition 160 for the user-verification rule 122A in a human-readable format. For example, in some embodiments, RAP 116 provides a GUI with a set of GUI components usable by the user 154 to provide the user-verification rule definition 160. In other embodiments, the RAP 116 provides an interface (e.g., a text-based interface) through which the user 154 may provide a user-verification rule definition 160 in a text-based format for the user-verification rule 122A. As described in detail below, server system 102, in various embodiments, is operable to use the user-verification rule definition 160 to convert the user-verification rule 122A from a first format (e.g., human-readable) to a second, machine-usable format (e.g., source code) that is usable by the user-verification service 112 to apply the user-verification rule 122A.

In the depicted embodiment, user-verification service 112 includes context capture framework 114. In various embodiments, the user-verification service 112 may store information about its use of the various user-verification rules 122 and then pass that information to the context capture framework 114. The context capture framework 114, in various embodiments, determines what items of information to include in an event message, documented the use of a particular user-verification rule 122, based on the current version of that user-verification rule 122. Context capture framework 114 is described in detail below with reference to FIGS. 2 and 5. Note, however, that, in various embodiments, the context capture framework 114 is operable to automatically generate or update a schema used, by the user-verification service 112, to document usage of the user-verification rules 122. Stated differently, in various embodiments the context capture framework 114 is operable to automatically alter the schema used to document uses of a given user-verification rule 122 based on the latest version of the rule 122. For example, in some embodiments, as the user-verification service 112 utilizes different user-verification rules 122, the context capture framework 114 generates event messages that specify details associated with that usage. In various embodiments, these event messages may be stored (e.g., as user-verification data 124) for subsequent use in generating user-verification metric data. For example, server system 102 of FIG. 1 further includes data visualization module 118. In various embodiments, the user-verification data 124 may be queried (as described in more detail below) to generate user-verification metric data, which may then be used by the data visualization module 118 to generate user-verification visualization data 164 for the user 154.

In various embodiments, as a user-verification rule 122 is added, the context capture framework 114 creates a schema used, by the user-verification service 112, to format the event messages used to document that usage of the new user-verification rule 122 by the user-verification service 112. Similarly, as an existing user-verification rule 122 is modified, the context capture framework 114 adapts the schema used to format event messages corresponding to the usage of the updated user-verification rule 122. Stated differently, as a user-verification rule 122 is updated (or a new user-verification rule 122 created), the context capture framework 114 adapts the set of information that is included in the resulting event messages for uses of that user-verification rule 122 so as to provide greater, and more useful, context relating to the uses of that rule 122, beyond merely whether the user passed or failed. This additional contextual information allows for the generation and reporting of metrics data about how the rule 122 has been applied, its success over time, by region, by user type, etc.

In various embodiments, autonomously updating the schemas used to document uses of the user-verification rules 122 may provide various technical benefits and improve the functioning of the user-verification service 112 and the server system 102 as a whole. For example, consider a prior user-verification service (e.g., as part of a KYC service) in which the items of information logged for a particular application of a rule (e.g., KYC rule) are determined manually, either for each different rule or for all rules implemented by the service. In such systems, typically only the end result of the user-verification event (e.g., did the user successfully satisfy the applicable user-verification rule(s)) is documented, which may drastically limit the ability to gain useful insights into the performance of the user-verification rules. For example, though such a system may record that a particular user failed a particular user-verification rule, it may not capture why that user failed to satisfy the rule— which aspect of the user-verification requirement the user was unable to satisfy. As an additional example, using such a system it would be difficult or impossible to determine metrics such as how many users are stuck at each stage (e.g., the document upload stage, the electronic verification stage, the multi-factor authentication stage, etc.) of the user-verification process specified by a given user-verification rule.

One hypothetical approach to this problem would be to "over-store" information about a given use of a user-verification rule, even if some of that information isn't relevant to the rule or the metrics of interest for the corresponding rule. Using such an approach may present various technical shortcomings, however. For example, by storing this "extra" information about these events, such systems are wasting significant amounts of storage space and computational resources that could be otherwise used by the system. This technical problem is compounded for organizations that implement many (e.g., thousands) of rules across multiple different countries for many users (e.g., millions).

As another hypothetical approach to address this problem, a prior system may attempt to manually update the information stored for a given application of the various different user-verification rules. This approach, too, presents various technical disadvantages. For example, manually updating the items of information recorded for each different rule is a time-consuming task that, typically, would need to be implemented by a technical user of the organization (e.g., a software developer). In instances in which there are a large number of rules (e.g., thousands) that may be changed and updated frequently, the task of updating the items of information to record for each of these different rules becomes exceedingly time-consuming and expensive. Further, in such instances, there may be a significant lag (e.g., days, weeks, months) between the time at which a new or updated rule is defined and the time at which the new set of information to record for that new or updated rule is established. During this time period, the system will not be recording the desired items of information about uses of the rule, degrading the quality of the metric data that can be generated about these uses of the rule and, accordingly, decreasing the value of, and confidence in, the user-verification service (or, in some instances, the KYC service).

In various embodiments, however, use of the context capture framework 114 to update the schema used to document uses of a user-verification rule by the user-verification service 112 may address these technical problems. For example, in various embodiments, the disclosed techniques allow user-verification rules to be implemented more quickly, in a more scalable manner, and with less manual intervention than prior techniques. Further, by automatically adapting the schema used to document uses of the user-verification rules 122 based on the most-current version of those rule, the disclosed techniques capture the relevant contextual information relating to the usage of the new or updated user-verification rules 122, saving storage space and improving the quality of the user-verification metric data. Stated differently, in some embodiments, by capturing additional contextual information that is relevant to the respective user-verification rule being applied, the disclosed techniques enable the generation of insightful user-verification metric data that may provide an audit trail detailing why a particular verification result was reached (e.g., the user supplied the incorrect date of birth).

Figure 2:
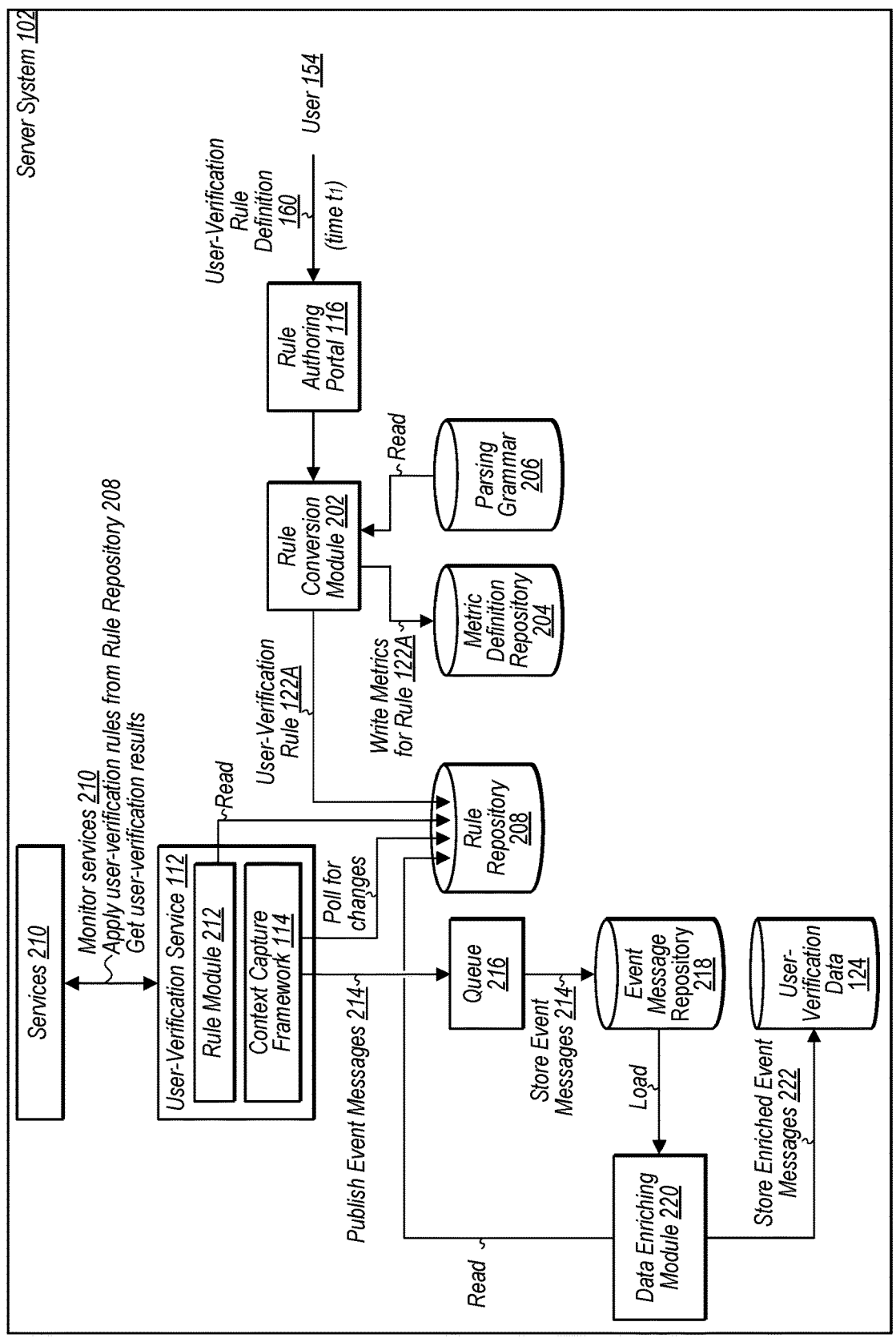
FIGS. 2-3 are block diagrams providing more detailed depictions of the server system of FIG. 1, according to some embodiments.

Turning now to FIG. 2, block diagram 200 provides a more detailed depiction of server system 102, according to some embodiments. In various embodiments, server system 102 is operable to receive a new or updated user-verification rule definition 160 for a user-verification rule 122, convert that user-verification rule 122 into a machine-usable format, and document uses of the new or updated user-verification rule 122 as it is utilized by the user-verification service 112.

For example, in the depicted embodiment the server system 102 includes RAP 116 and rule conversion module 202. As noted above, in various embodiments the RAP 116 is usable to provide an interface through which the user 154 may provide the user-verification rule definition 160 for the user-verification rule 122A in a human-readable format. In FIG. 2, user 154 specifies (at a first time ti) a user-verification rule definition 160 for a user-verification rule 122A using the interface provided by RAP 116. This information is then passed to the rule conversion module 202, which converts the user-verification rule 122A from the first, human-readable format to a second, machine-usable format. This process, according to some non-limiting embodiments, is described in more detail below with reference to FIG. 4A. Note, however, that in embodiments in which the user-verification rule definition 160 is provided as text, the rule conversion module 202 may parse the definition 160 using a parsing grammar 206 to convert various parameters from the definition 160 into a machine-usable format (e.g., JSON, Python™ source code, Java™ source code, XML, etc.). Further note that, in various embodiments, the user 154 may specify (e.g., while providing the user-verification rule definition 160) one or more metrics for the user-verification rule 122A. For example, in some embodiments the user 154 may select one or more desired metrics from a library of pre-defined metrics (e.g., how many requests have been declined in the U.S. based on user-verification rule 122A). In other embodiments, however, the user 154 may specify a custom metric for the user-verification rule 122A, for example using either the GUI or text-based interface provided by the RAP 116. These metrics may be stored in the metric definition repository 204 for subsequent use in generating a database query used to retrieve metric data from event data, as described with reference to FIG. 3.

As shown in FIG. 2, server system 102 provides one or more services 210, for example via the software applications 106 and web resources 110 hosted by application server 104 and web server 108 (respectively) of FIG. 1. Various non-limiting examples are described in which the services 210 include online payment services though, as noted above, server system 102 may provide any of various suitable services 210. In various embodiments, user-verification service 112 is operable to monitor the activity of the services 210 to determine when and how to apply the various user-verification rules 122 from rule repository 208. For example, once the rule conversion module 202 generates the machine-usable version of the user-verification rule 122A, it may be stored in the rule repository 208. Further, in the embodiment of FIG. 2, user-verification service 112 includes a rule module 212, which in various embodiments is usable to read user-verification rules 122 from the rule repository 208 and apply them to live requests being serviced by the services 210. For example, in various embodiments the user-verification service 112 may evaluate the characteristics of a request from an end user (e.g., request 140 to perform operation 142, as shown in FIG. 1) to determine whether any of the user-verification rules 122 have been triggered. If so, the user-verification service 112 applies the relevant user-verification rule 122, for example by requesting additional identifying information from the user, requesting the user perform a multi-factor authentication operation, etc.

As described in more detail below with reference to FIG. 5, the user-verification service 112 may collect information relating to a use of the user-verification rule 122 and provide it to the context capture framework 114 for processing. For example, in various embodiments the user-verification service 112 may provide a log message to the context capture framework 114 that includes information from uses of one or more (and potentially many) different user-verification rules 122 for asynchronous processing by the context capture framework 114. Based on this information, the context capture framework 114 may generate and publish one or more corresponding event messages 214 used to document the uses of the user-verification rules 122. In various embodiments, the context capture framework 114 generates these event messages 214 using a format that is consistent with a most-current version of the corresponding user-verification rule 122. For instance, as shown in FIG. 2, the context capture framework 114 polls (e.g., periodically at any other suitable interval, while generating event messages 214, etc.) the rule repository 208 for changes to the user-verification rules 122. Continuing with the example above, once the new (or updated) user-verification rule 122A has been stored in the rule repository 208, the context capture framework 114 may retrieve information about the new version of the user-verification rule 122A and create a new (or update an existing) schema for the user-verification rule 122A, which may then be used to generate event messages 214 corresponding to uses of the user-verification rule 122A, as described in more detail below with reference to FIG. 5. For the purposes of the present discussion, however, note that, in various embodiments, the context capture framework 114 determines whether there is any data from the log messages to exclude or to be added to a given event message 214 based on the schema, where the schema is generated by reading the rules and the metric definitions. Consider, as a non-limiting example, a new metric that measures how many users have completed CIP from the U.S. In this non-limiting example, the schema will be generated to require the user's "country code" and "CIP status." In turn, the context capture framework 114, in this example, may decide that in the event messages 214 for this metric, it should capture the "country code" and "CIP status" if these were not captured before.

In the depicted embodiment, the context capture framework 114 publishes the event messages 214 to a queue 216 (implemented, in one non-limiting example, using Apache™ Kafka), from which the event messages 214 may be stored in the event message repository 218 (implemented, as a non-limiting example, using a relational database or any other suitable data storage technology). In FIG. 2, server system 102 includes data enriching module 220, which in various embodiments is operable to retrieve event messages 214 from the event message repository 218 and "enrich" those event messages 214 with one or more additional items of information. For example, in various embodiments, there may be additional items of information that would be desirable (e.g., for use in generating metric data) to include in the event messages 214 that is not included by the context capture framework 114. Stated differently, in various embodiments the data enriching module 220 is looking for changes to the rules so that it can detect if and when to change the schema accordingly.

Consider, as a non-limiting example, an instance in which the user-verification service 112 is one of multiple different activity-monitoring services included in a KYC service utilized by the server system 102. In such an embodiment, the event messages 214 from the user-verification service 112 may include some, but not all, of the information needed or desired for generation of metric data relating to the compliance with the KYC rules. For example, in some such embodiments, an event message 214 from the user-verification service 112 may include an alias value (e.g., username) for a given user account, but may not specify the geographic region with which the user account is associated, or which of the services 210 (e.g., PayPal™, Venmo™, Hyperwallet™, etc.) for which the user account was generated. Rather than requiring the context capture framework 114 to retrieve this information, which may slow down the operation of the context capture framework 114, in various embodiments this data-enriching process may be performed asynchronously by the data enriching module 220. For example, in various embodiments the event messages 214 may specify the respective user-verification rules 122 with which they are associated. Using the identifier for a given user-verification rule 122, the data enriching module 220 may determine (e.g., based on the one or more metrics for that rule 122) that the event message 214 is missing one or more items of information needed to generate the desired metrics. Based on the alias value for the user account (e.g., of user 134), the data enriching module 220 may then access account information for the user account to determine, for instance, the geographic region with which the user account is associated, the service 210 for which the user account was created, etc.

In various embodiments, the data enriching module 220 may retrieve this additional information and generate an enriched event message 222. For example, in instances in which an event message 214 is stored as an object or a database record, the data enriching module 220 may update (or add) fields with data values for this additional information. In the depicted embodiment, once an event message 214 has been enriched to include these one or more items of information, the enriched event message 222 may be stored as part of the user-verification data 124. In some embodiments, user-verification data 124 may be stored using an online analytical processing ("OLAP") database, implemented, as one non-limiting example, using BigQuery™ provided by Google™. In various embodiments, this user-verification data 124 may be queried to generate metrics relating to the usage of the various user-verification rules 122 by the user-verification service 112, as described below. (Note that, in some embodiments, the data enriching module 220 may not add data to every event message 214. That is, in some embodiments, a given event message 214 may not be missing any data values and, in such instances, the data enriching module 220 may simply store the event message 214 as part of the user-verification data 124.)

Figure 3:
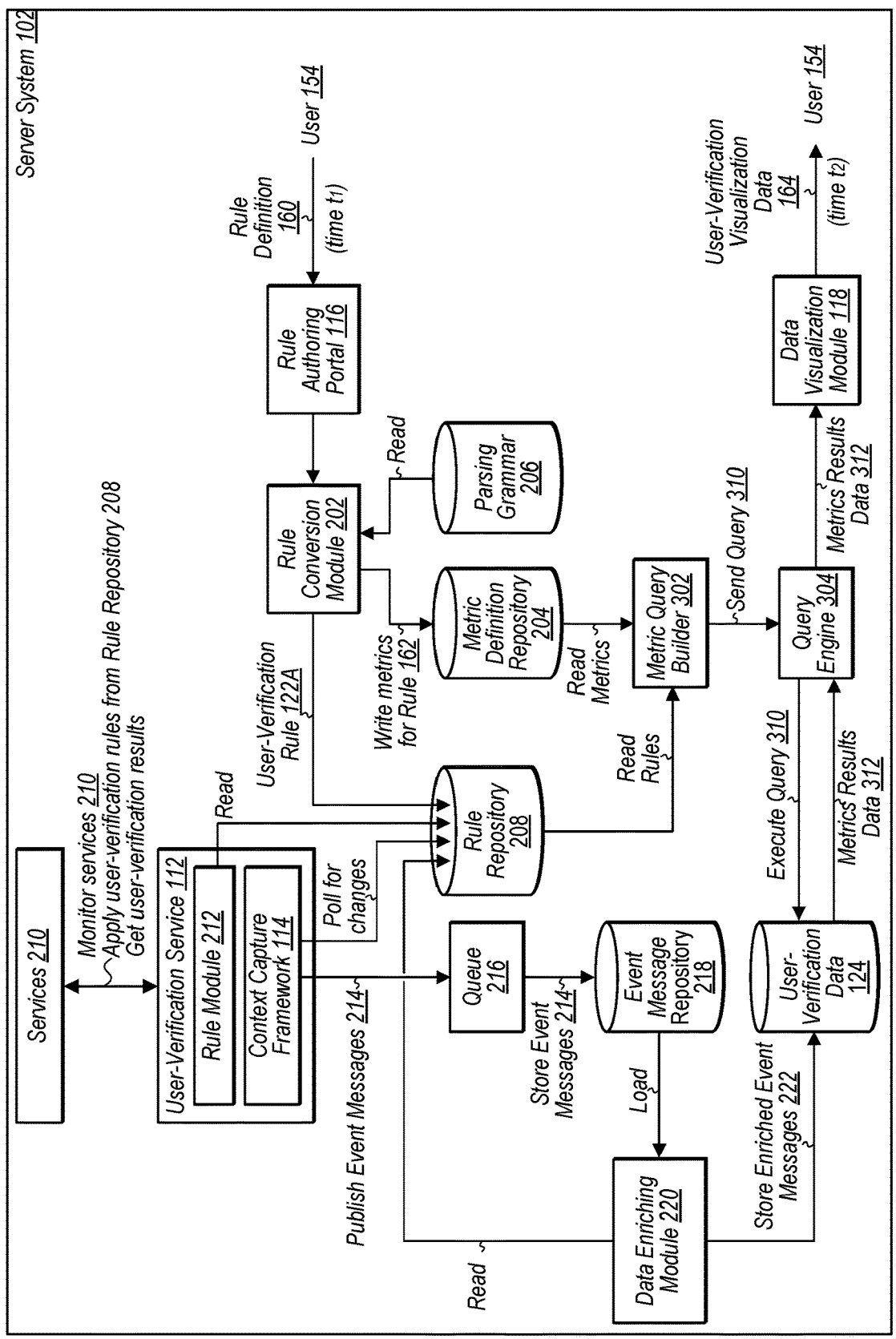

Referring now to FIG. 3, block diagram 300 provides a more detailed depiction of server system 102, according to some embodiments. In particular, server system 102 of FIG. 3 further includes metric query builder 302, query engine 304, and data visualization module 118.

Metric query builder 302, in various embodiments, is operable to generate one or more queries 310 (e.g., SQL queries) to extract useful metrics from the logged event messages so that these metrics can then be visualized for a user (e.g., user 154). For example, in various embodiments, the metric query builder 302 is operable to read the latest version of the user-verification rules 122 and a predefined basic set of metric definitions and then automatically generate new queries 310 for the desired metrics. Note that, in various embodiments, the metric query builder 302 is capable of automatically adapting to new user-verification rules 122 based on the knowledge of previous user-verification rules 122. As a non-limiting example, the set of metrics that can be automatically generated for a particular user-verification rule 122, such as rule 122A, may include: the number of users to which rule 122A applies daily, weekly, monthly, and yearly; the number of users that are blocked due to rule 122A daily, weekly, monthly, and yearly; the number of users who have completed the verification required by rule 122A daily, weekly, monthly, and yearly. In various embodiments, as a new or updated user-verification rule 122 is defined, the metric query builder 302 is operable to generate the necessary queries without further human intervention. Non-limiting embodiments of metric query builder 302 are described below with reference to FIG. 6. For the purposes of the present discussion, note that, in some embodiments, metric definitions may be built by learning from past user-verification requirements, and the generated metric definitions, in turn, may trigger the generation of new queries via the metric query builder 302. As a non-limiting example, a previous user-verification requirement may require metrics (e.g., defined by a metrics author) of the number of U.S. users that fail KYC due to missing identity documents. Continuing with this example, a new metric may be auto-generated as the number of users from any country that fail KYC due to a failure to provide some identifying information, while another leakage metric may be generated to determine whether there are any users who failed to provide the required identifying documents but still were able to pass the KYC rule(s) and is provisioned for the product. In other embodiments, the queries may be automatically constructed based on pre-defined metrics specific to the domain. For example, a time dimension (e.g., hourly, daily, weekly, monthly, yearly), account status (e.g., new user account, activated user account, blocked user account), program-specific status (e.g., applicable, capability blocked, customer identification program ("CIP") completed/pending/failed), etc.

In various embodiments, once generated by the metric query builder 302, the query 310 may be sent to the query engine 304. In various embodiments, the query engine 304 is operable to execute the query 310 against the user-verification data 124 to retrieve metric results data 312. Note that, although shown separately in FIG. 3, in some embodiments the query engine 304 may be included as part of the data storage technology used to store the user-verification data 124. For example, in some embodiments, the user-verification data 124 may be stored and the query engine 304 implemented using BigQuery™ by Google™, as part of an Oracle™ database, or using any other suitable technology.

In FIG. 3, once retrieved by the query engine 304, the metric results data 312 may be passed to the data visualization module 118, which, in various embodiments, is usable to generate user-verification visualization data 164 for the user 154. For example, in some embodiments, the user-verification visualization data 164 may be data usable to populate one or more visualization components using, for example, Tableau™, Google™ Data Studio, or any other suitable data-visualization service or tool. Note that, in the depicted embodiment, the user-verification visualization data 164 is provided to the user 154 at a time $t_2$ that is subsequent to the time $t_1$ at which the user-verification rule definition 160 was provided via the RAP 116. For example, in some embodiments, a user 154 may use the RAP 116 to define a user-verification rule 122A at a first time $t_1$ and then return at a subsequent time $t_2$ (e.g., days, weeks, months later) to visualize metrics related to the usage of that rule 122A. Note, however, that this example is provided merely as one non-limiting use-case. In various embodiments, the user of the data visualization module 118 may be different than the user that provided the user-verification rule definition 160 for one or more of the user-verification rules 122, as desired. Further, in various embodiments, a user 154 may view user-verification visualization data 164 at any desired time.

Figure 4A:
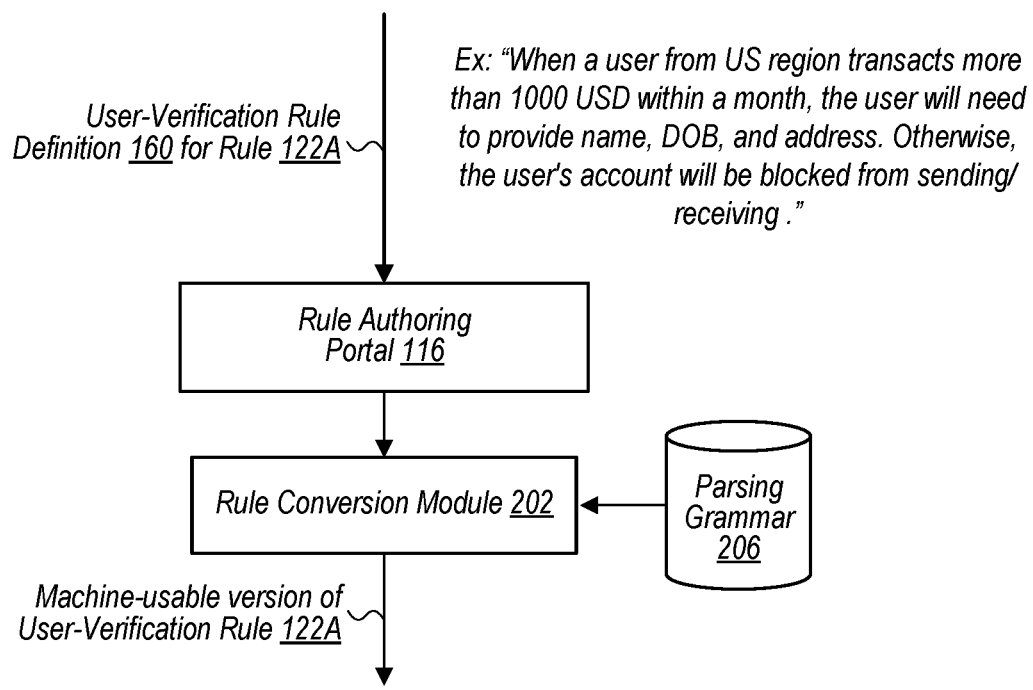
FIG. 4A is a block diagram illustrating an example rule authoring portal and rule conversion module, according to some embodiments.

Turning now to FIG. 4A, block diagram 400 depicts a non-limiting example of RAP 116 and rule conversion module 202, which, in various embodiments, are usable to receive a user-verification rule definition 160 for a user-verification rule 122 and convert the rule 122 from a first format in which it was provided into a second, machine-usable format. In the depicted embodiment, for example, the RAP 116 receives a user-verification rule definition 160 for rule 122A. In this non-limiting example, the definition 160 (specified in a plaintext format, for demonstration) provides that when a user from the U.S. (e.g., user 134) of service 210 transacts more than $1000 USD within a month, that user will need to provide their name, date of birth, and address information for verification. If the user does not do so, that user's account is blocked from further transactions. Again, note that this non-limiting example is provided in the context in which the server system 102 provides online payment services to remote users. The disclosed techniques are not limited to such a context, however, and may be applied in server systems 102 that provide any of various different types of services.

Note that, in some embodiments, the RAP 116 may provide a graphical user interface ("GUI"), for example via a web form on a webpage accessible to an authorized user (e.g., user 154), that the user 154 may use to specify individual characteristics of the user-verification rule definition 160. For example, the GUI may include a series of graphical input components (e.g., drop-down menus, pick-lists, text boxes, etc.) that user 154 may use to specify the details of the rule 122. In the current example, for instance, the GUI may include an input component usable to specify the jurisdiction (e.g., the U.S.) for which the rule 122A applies, the capability (e.g., sending or receiving funds) to which the rule 122A applies, relational operators (e.g., greater than or equal to), relevant numerical limits (e.g., 1000), etc. In various embodiments, the rule conversion module 202 may map these user-specified values to appropriate variables in the machine-usable version of the rule 122A (as described below with reference to FIG. 4B).

In other embodiments, the RAP 116 may provide an interface (e.g., one or more textboxes) to allow the user 154 to provide the user-verification rule definition 160 in a text-based format that may be converted to a format usable by the user-verification service 112. In the depicted embodiment, for example, rule conversion module 202 includes a parsing grammar 206, which may define a simplified syntax in which the user 154 may provide a user-verification rule definition 160 for a user-verification rule 122A. In some embodiments, this simplified syntax allows the user 154 to provide the definition 160 as a near-plaintext description of the desired functionality for the rule 122, which may then be parsed and converted into a machine-usable (e.g., source code) format by the rule conversion module 202. In some non-limiting embodiments, for example, the rule conversion module 202 may us the ANTLR parser generator tool to generate a parser or recognizer (or combination thereof)

operable to parse the user-verification rule definition 160 and generate the machine-usable version of the rule 122A, though other suitable tools or libraries may be used as desired. Continuing with this non-limiting example, in some embodiments the parsing grammar 206 may be used as an input to ANTLR to generate a parser for the language specified by the parsing grammar 206. In some such embodiments, the parser is operable to parse an input user-verification rule definition 160, recognize the various tokens included in this definition 160, and generate an abstract syntax tree or parse tree that provides a logical representation of the contents of the definition 160. Further, in this example embodiment, the rule conversion module 202 may use the abstract syntax tree or parse tree to create the machine-usable version of the rule 122A, for example by creating source code statements in a syntax of a desired programming language (e.g., Java™, Python™, C, C#, Perl, etc.).

Referring now to FIG. 4B, for example, block diagram 450 provides an example machine-readable version of the rule 122A specified in FIG. 4A, according to some embodiments. In this non-limiting example, the machine-readable version of the rule 122A is specified in a domain-specific language defined for server system 102, though any of various suitable programming or scripting language (e.g., Python™, JavaScript, PHP, Java™, etc.) may be used, as desired.

In the non-limiting example depicted in FIG. 4B, the various parameters specified by user 154 (via either the GUI or text-based interface provided by the RAP 116) have been used to construct a version of the rule 122A that is usable by the user-verification service 112. In this non-limiting example, the machine-readable version of the rule 122A includes a "metadata" section that specifies various items of metadata relating to the rule 122A (e.g., an id, priority level, when it was first created, when it was last updated, and a description) and a section providing an if-then statement specifying the logic of the rule 122A, including the triggering conditions (e.g., the jurisdiction is the U.S., a limit of 1000, the currency is in USD, the relevant time period is the last 30 days, and the relevant capabilities are sending or receiving funds), a user-verification requirement (e.g., for the user to provide their name, date of birth, and address), and an action to take until that user-verification requirement is met (e.g., block all transactions for that user account). Note again that this embodiment is provided merely as a non-limiting example for the purposes of illustration. In other embodiments, the machine-readable version of a rule 122 may be generated in any suitable programming language and include additional, fewer, or different components than those shown in FIG. 4B.

Figure 5:
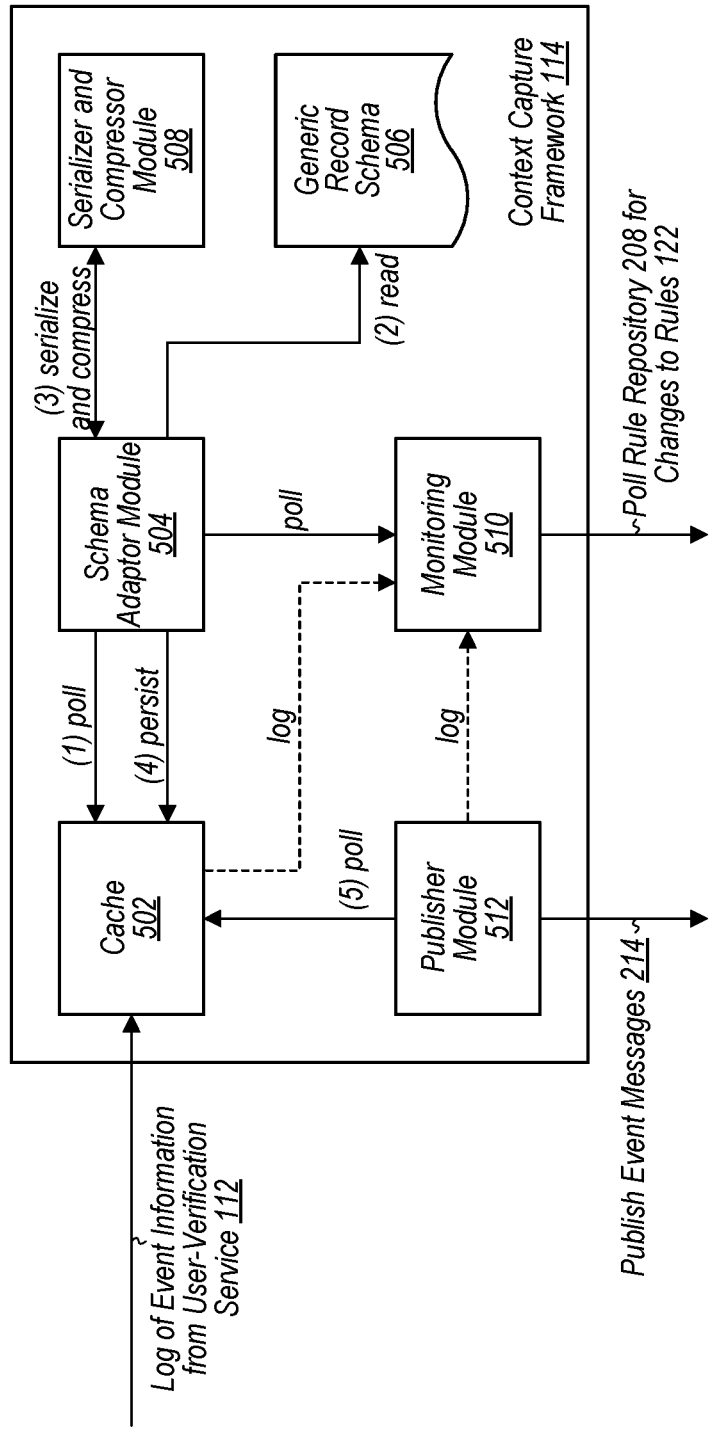
FIG. 5 is a block diagram illustrating an example context capture framework, according to some embodiments.

FIG. 5 depicts a block diagram 500 of an example context capture framework 114, according to some embodiments. In some embodiments, the context capture framework 114 is implemented as a library that is used by the user-verification service 112 (optionally in addition to one or more other monitoring services implemented by the server system 102).

In various embodiments, the context capture framework 114 is operable to automatically determine what information to include in an event message 214 used to document a particular use or application of a particular user-verification rule 122 (e.g., a KYC rule). That is, in various embodiments the context capture framework 114 is operable to adapt the schema that defines what items of information are "captured" and included in the event messages 214 based on the addition of new rules 122 or updates to existing rules 122. In various embodiments, the adaptation of the schema is performed automatically by the context capture framework 114 without additional manual intervention by the user 154 that provided the user-verification rule definition 160. For example, in various embodiments the user-verification service 112 utilizes its own data model (e.g., used to represent user accounts, policies, etc.) that is separate from, and therefore may be different than, the data model that is desired to monitor and capture the relevant metric data. That is, the items of information that may be desirable to capture so as to generate insightful metric data may vary over time, for example as new rules are added or existing rules updated. Accordingly, in various embodiments the context capture framework 114 is operable to update the schemas used to document uses, by the user-verification service 112, of the different user-verification rules 122.

For example, as shown in FIG. 5, the user-verification service 112 may send (e.g., asynchronously as part of a batch operation, in real-time or near real-time, etc.) a log of event information to the context capture framework 114. In various embodiments, the event information corresponds to one or more uses of one or more user-verification rules 122. Note that, in this disclosure, the term "event" is used to refer to the use of a user-verification rule 122 by the user-verification service 112. Accordingly, in various embodiments the term "event information" is used to refer to information collected (e.g., by the user-verification service 112) about a given use of a user-verification rule 122. Non-limiting example of "event information" include any one or more of: an alias (e.g., an account ID) associated with the user account for which the given rule 122 was used, the time and date of the event, country code, tenant, an identifier for the rule 122, whether the user satisfied the requirements specified by the rule (e.g., by providing the requested identifying information for verification), various items of user information for the user, an identification of the requested operation 142, service version, the response, status of the request, exception log, completed duration, start time, end time, details of the client device 130 (e.g., type of device, IP address, etc.) or the software application 132 (e.g., browser used), etc. Further note that, in various embodiments, one or more items of information included in this "event information" may be encrypted and compressed for privacy purposes.

In various embodiments, the context capture framework 114 is operable to determine how to generate and format event messages 214 for these different events based on the current version of the corresponding user-verification rules 122. In the depicted embodiment, the context capture framework 114 includes a cache 502 that is usable to temporarily store the event information from the user-verification service 112 to facilitate the asynchronous processing of the event information and the generation of the event messages 214.

Context capture framework 114 of FIG. 5 further includes schema adaptor module 504, which, in various embodiments, is operable to adapt the schema used to document a given use of a user-verification rule 122. For example, in the depicted embodiment, the schema adaptor module 504 polls the cache 502 for event information corresponding to uses of the user-verification rules 122. As a non-limiting example to facilitate discussion of FIG. 5, assume that the event information includes information corresponding to a use of user-verification rule 122A discussed above. Once it has retrieved this event information, the schema adaptor module 504 then reads a generic record schema 506 to use as a template in formatting an event message 214 for this user-verification event. In some embodiments, this generic record schema 506 is a default template used as a starting point in generating an updated schema for the user-verification rule 122A. As a non-limiting example, in various embodiments this generic record schema 506 may include fields to identify or otherwise indicate one or more of: requested operation 142, response from the user-verification service 112 (e.g., verification result), technical dimensions (e.g., service behavior log, times started and finished, and other monitoring metrics), metadata (such as auditing and triaging information of the service execution, e.g., service build version, context capture framework 114 version, data center and cluster identifier, machine IP address, etc.), or any of various other items of information.

Note that, in various embodiments, the schema adaptor module 504 is operable to dynamically modify this generic record schema 506 to include various items of information specified by current version of the corresponding user-verification rule 122 (rule 122A, in the current example). That is, in various embodiments the schema adaptor module 504 is operable to automatically generate an updated schema for a given user-verification rule 122 based on an updated rule definition 160 for that rule 122. In FIG. 5, for example, context capture framework 114 includes monitoring module 510, which in various embodiments is operable to poll the rule repository 208 to check for changes or additions to the user-verification rules 122. In various embodiments, the monitoring module 510 reads the latest version of the user-verification rules 122 from the rule repository 208 to generate the updated schema for the respective rules 122.

In some embodiments, for example, the monitoring module 510 may poll the rule repository 208 for rule changes periodically. In other embodiments, the monitoring module 510 may poll the rule repository 208 for rule changes when the schema adaptor module 504 is generating an updated schema to use to document the use of a particular rule 122. For example, in response to retrieving event information corresponding to a use of rule 122A, the schema adaptor module 504 may send a request to the monitoring module 510 for information about the current version of the rule 122A (e.g., to determine whether there have been any changes since the last time an event message 214 has been generated for rule 122A). In such embodiments, in response to this request, the monitoring module 510 may poll the rule repository 208 for the current version of the rule 122A. Note that, in various embodiments, if there have been no changes to a particular rule 122 since the last time the context capture framework 114 generated an event message 214 for that rule 122, the context capture framework 114 may re-use the previously generated schema for that rule 122. If there have been changes to the relevant rule 122, however, the schema adaptor module 504 may update the corresponding schema accordingly. Continuing with our example, the monitoring module 510 may provide information about the current version of rule 122A to the schema adaptor module 504, which may use this information to update the schema used to document uses of rule 122A. As one non-limiting example, if the updated version of the rule 122A includes additional items of information relative to the previous version of rule 122A, the schema adaptor module 504 may generate an updated schema that includes one or more new fields for these additional items of information. Further, in various embodiments, the context capture framework is operable to automatically infer a schema from the data that it ingests from the user-verification service 112.

Once it has generated this updated schema, the schema adaptor module 504 may generate an event message 214 for a particular use of a user-verification rule 122 based on that updated schema. For example, the schema adaptor module 504 may create an event message 214 for the use of the rule 122A using the updated schema. Note that, in some embodiments, creating the event message 214 may include excluding one or more items of personally identifiable information ("PII") or other potentially sensitive user data from the event message 214. In the embodiment depicted in FIG. 5, context capture framework 114 includes a serializer and compressor module 508. In various embodiments, the serializer and compressor module 508 is operable to serialize and compress event messages 214 facilitate the efficient transmittal and storage of these event messages 214. In the depicted embodiment, once serialized and compressed, the event messages 214 are returned to the schema adaptor module 504, which then stores the serialized and compressed event messages 214 in the cache 502. The context capture framework 114 of FIG. 5 further includes publisher module 512, which in various embodiments is operable to retrieve the processed event messages 214 from the cache 502 and publish them to a data store, such as queue 216 or event message repository 218. Note that, in various embodiments, the context capture framework 114 operates in an asynchronous manner relative to the user-verification service 112 so as to avoid negatively impacting the speed or availability of the user-verification service 112.

Figure 6:
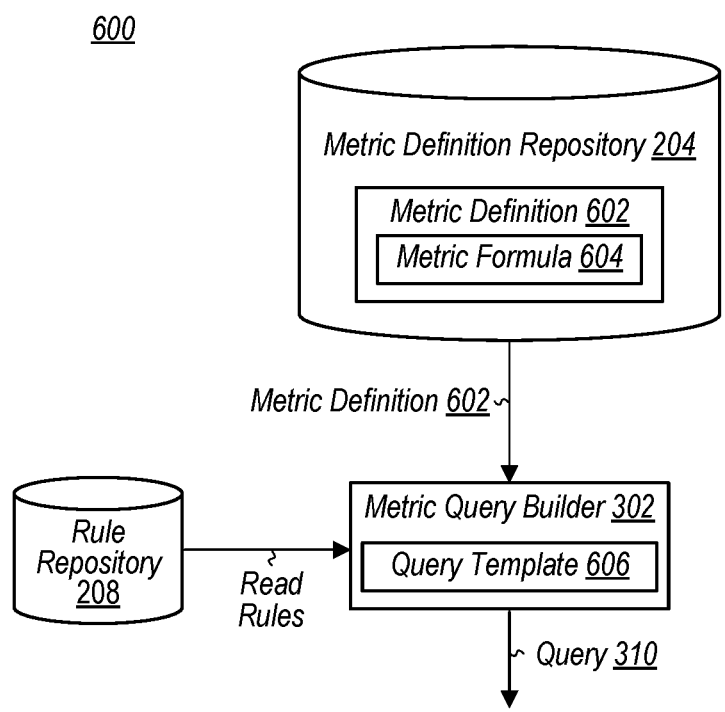
FIG. 6 is a block diagram illustrating an example metric query builder, according to some embodiments.

Turning now to FIG. 6, block diagram 600 depicts an example metric query builder 302, according to some embodiments. As noted above, in various embodiments the metric query builder 302 is operable to generate one or more queries 310 usable to retrieve metric results data 312 for one or more of the user-verification rules 122.

In various embodiments, the metric query builder 302 automatically constructs the queries 310 for the different rules 122, which may provide various improvements over prior techniques. For example, in prior systems, a user would be required to manually define the queries to be used to retrieve relevant metric data needed to monitor the use of a given user-verification rule, a time- and labor-intensive process that, typically, needed to be performed by one or more technical users (e.g., software developers) associated with the service provider. In various embodiments, however, the disclosed server system 102 allows a user (e.g., user 154) to specify one or more metrics of interest while defining a user-verification rule 122. Based on these metrics, the metric query builder 302, in various embodiments, is operable to automatically construct the relevant queries 310 needed to retrieve the metric data from the user-verification data 124 so that the relevant metric data may be visualized via the data visualization module 118.

For example, in the non-limiting embodiment of FIG. 6, the metric definition repository 204 includes a metric definition 602 with a metric formula 604. In various embodiments, the metric query builder 302 may use the metric definition 602 associated with a given user-verification rule 122 to generate the query 310 (or queries) for that rule 122. In an example embodiment, the user 154 may be able to select or define (e.g., via one or more GUI components or via a text-based interface) one or more metrics of interest when providing the user-verification rule definition 160 for a rule 122. In some embodiments, for example, the server system 102 may maintain a set of pre-defined metric definitions 602, with corresponding metric formulas 604, that a user 154 may choose from for a given rule 122. In an example use case, the user would select one or more metrics of interest when defining the user-verification rule 122 (e.g., a KYC rule), where, on the backend, these metrics have corresponding metric definitions 602 with the one or more relevant metric formulas 604 used to calculate the metric.

As one non-limiting example, one metric of interest to the user 154 may be the "decline rate" for rule 122A—the percentage of the time that a requested operation is declined by server system 102 because the requesting user was unable to supply the requested user-verification information. Other non-limiting examples of metrics include the number of times a rule 122 has been applied, the number of times a rule 122 is applied per jurisdiction, decline rate per jurisdiction, "leakage" metrics, etc. In various embodiments, the metric query builder 302 pulls the relevant components (e.g., variable names for tables, conditions, etc.) from this metric formula 604 and inserts them into a query template 606 to generate the query 310. For example, for a metric that tracks the number of times requesting users have failed rule 122A, the metric query builder 302 may extract relevant table names, an identifier for the rule 122A, a request status (e.g., "FAILED"), or any other suitable items of information from the metric formula 604 and insert those items of information into a query template 606 to generate the query 310. In some embodiments, for example, the query template 606 may be specific to the type of metric defined in the metric definition 602 such that the relevant items of information can be extracted from the metric definition 602 or metric formula 604 and inserted into the query template 606 to generate the query 310.

EXAMPLE METHODS

Figure 7A:
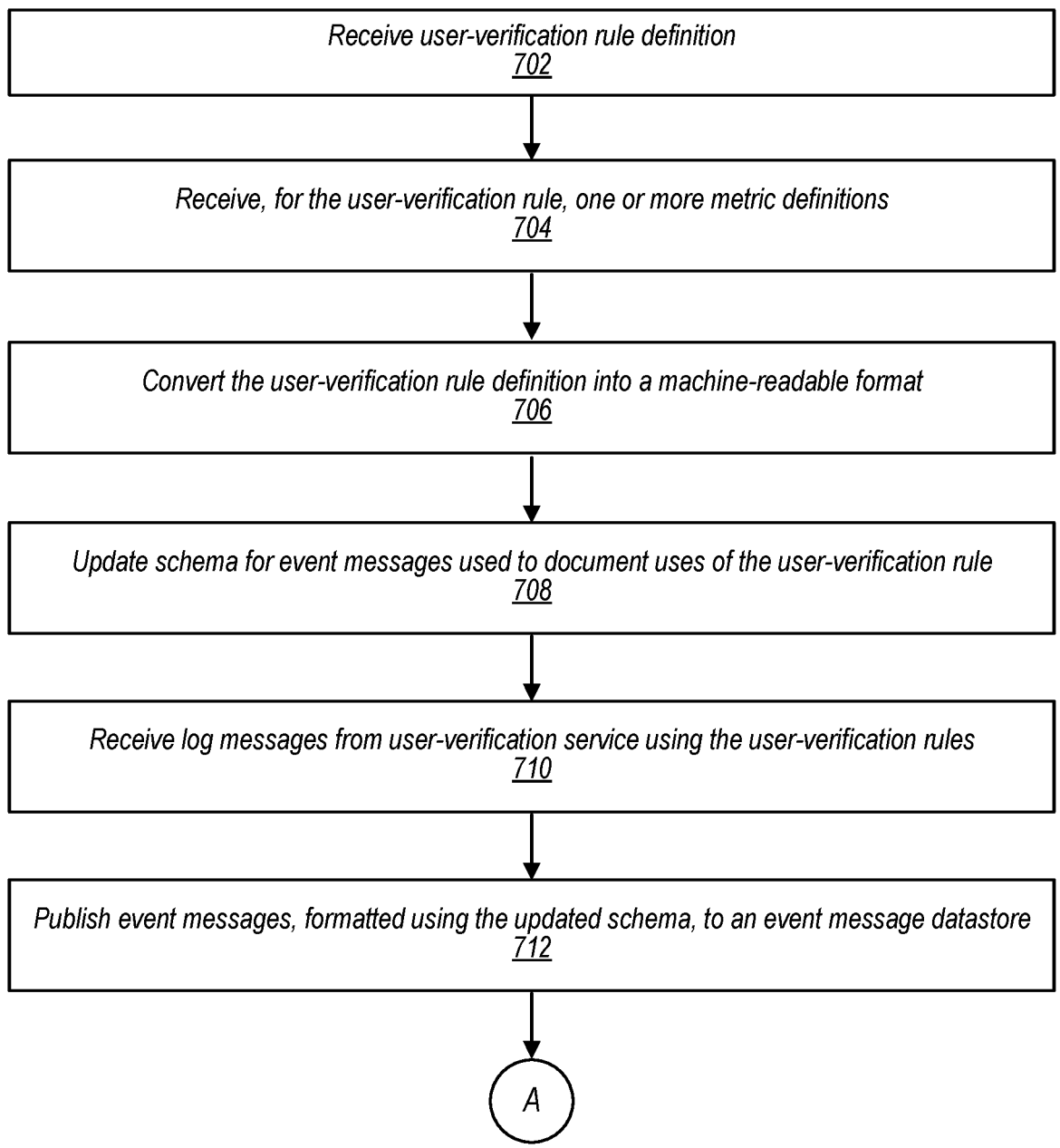
FIGS. 7A-7B depict a flow diagram illustrating an example method for automatically capturing and reporting user-verification metric data, according to some embodiments.
Figure 7B:
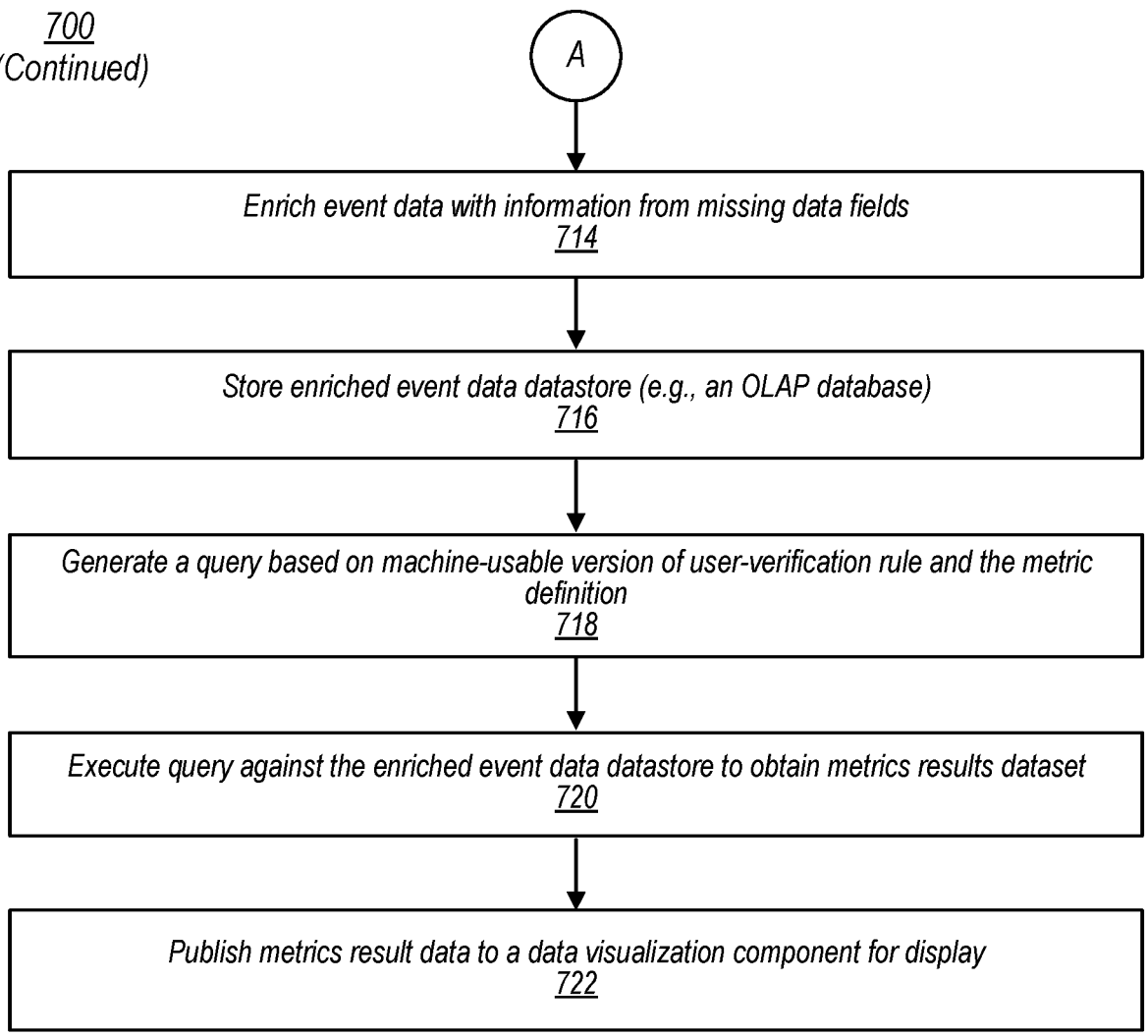

Referring now to FIGS. 7A-7B, a flow diagram illustrating an example method 700 for automatically capturing and reporting user-verification metric data is depicted, according to some embodiments. In various embodiments, method 700 may be performed by server system 102 of FIGS. 1-3 to receive a user-verification rule definition 160 for a user-verification rule 122, update the schema corresponding to that rule 122, and generate event messages 214 documenting uses of the user-verification rule 122 by a user-verification service 112. For example, server system 102 may include (or have access to) a non-transitory, computer-readable medium having program instructions stored thereon that are executable by the server system 102 to cause the operations described with reference to FIGS. 7A-7B. In FIG. 7A-7B, method 700 includes elements 702-722. While these elements are shown in a particular order for ease of understanding, other orders may be used. In various embodiments, some of the method elements may be performed concurrently, in a different order than shown, or may be omitted. Additional method elements may also be performed as desired.

In various embodiments, the server system 102 may maintain a set of user-verification rules 122 usable (e.g., by a user-verification service 112) to verify an identity of a user requesting to perform operations via a service 210 provided by the server system 102. For example, in some embodiments the user-verification service is included in a KYC service provided by the server system 102. At 702, in the illustrated embodiment, the server system 102 receives, a user-verification rule definition. For example, as described above, a user 154 may provide a user-verification rule definition 160 for a user-verification rule 122, e.g., rule 122A, via the RAP 116. In various embodiments, a particular user-verification rule 122, such as rule 122A, may indicate a particular operation of the service with which the particular user-verification rule 122A is associated, a set of one or more triggering conditions to determine when to apply the rule 122A, and a first set of user identification information to collect from a given user to satisfy the particular user-verification rule 122A.

In some embodiments, the definition 160 received at 702 is an updated rule definition 160 for a particular user-verification rule 122A, where the updated rule definition 160 specifies a second set of user identification information to collect from the given user to satisfy the particular user-verification rule 122A. As noted, in various embodiments the user 154 may provide the updated rule definition 160 via an interface (e.g., a GUI or text-based interface) provided by the RAP 116.

At 704, in the illustrated embodiment, the server system 102 receives, for the user-verification rule 122A, one or more metric definitions. For example, in various embodiments, while the user 154 provides the user-verification rule definition 160 for the rule 122A, the user 154 may also select, from a catalog of pre-defined metric definitions, one or more metric definitions to associate with the rule 122A. In other embodiments, the user 154 may also (or instead) provide a custom metric definition for a metric to associate with the rule 122A, for example using an interface provided via the RAP 116.

At 706, in the illustrated embodiment, the server system 102 converts the user-verification rule definition 160 into a machine-usable format. For example, as described above with reference to FIG. 4A, the rule conversion module 202 may receive the user-verification rule definition 160 from the RAP 116 and convert it from a first format to a second, different format that is usable by the user-verification service 112 to apply the rule 122A for live requests to perform the particular operation via the service(s) 210 provided by the server system 102. In embodiments in which the user-verification rule definition 160 is provided as a text-based format, 706 may include parsing the updated rule definition 160 for the user-verification rule 122A based on a parsing grammar 206 and, based on the parsing, converting one or more components of the user-verification rule from the first format to the second, different format.

At 708, in the illustrated embodiment, the server system 102 updates a schema for event messages used to document uses (e.g., by the user-verification service 112) of the user-verification rule 122A. For example, as described above, in various embodiments the context capture framework 114 automatically generates an updated schema for the particular user-verification rule 122A based on the updated user-verification rule definition 160, where the updated schema specifies a structure of event messages used to document uses of the user-verification rule 122A by the user-verification service 112, and where the updated schema includes a set of fields corresponding to the second set of user identification information.

At 710, in the illustrated embodiment, the server system 102 receives event logs from the user-verification service 112.using the user-verification rules 122 (e.g., including updated rule 122A). For example, in some embodiments the event logs may include information corresponding to a particular use of the user-verification rule 122A based on a first request 140, from a first user 134, to utilize a particular operation 142 of the service 210.

At 712, in the illustrated embodiment, the server system 102 publishes event messages 214, formatted using the updated schema, to an event message datastore (e.g., queue 216 or event message repository 218). For example, in some embodiments the context capture framework 114 may generate an event message 214 to document the particular use of the user-verification rule 122A, where the event message 214 is formatted according to the updated schema and includes data values for one or more of the set of fields corresponding to the second set of user identification information.

At 714, in the illustrated embodiment, the server system 102 enriches the event data from one or more missing data fields. For example, as described above, in some embodiments a given event message 214 may be missing data for one or more fields that may be necessary or desirable to generate useful metric data relating to the corresponding use of the respective user-verification rule 122. For example, the data enriching module 220 may determine that the event message 214 for the particular use of the user-verification rule 122A is missing a first data value for a first one of the set of fields corresponding to the second set of user identification information, retrieve the first data value for the first field from a set of user data associated with the first user, and add the first data value for the first field to the event message. At 716, in the illustrated embodiment, the server system 102 (e.g., data enriching module 220) stores that event message (e.g., an enriched event message 222) in an event message datastore (e.g., as part of user-verification data 124), which in some non-limiting embodiments may be implemented as an OLAP database.

At 718, in the illustrated embodiment, the server system 102 generates a query, for a particular user-verification rule 122, based on the machine-usable version of the user-verification rule 122 and the one or more metric definition for that rule 122. For example, in some embodiments the metric query builder 302 generates an updated query 310 for the particular user-verification rule 122A based on the updated rule definition 160. In some such embodiments, this generating includes extracting one or more data values from a metric formula included in a metric definition associated with the particular user-verification rule 122A and then inserting the one or more data values into a query template to generate the updated query 310 for the particular user-verification rule 122A.

At 720, in the illustrated embodiment, the server system 102 executes the query 310 against the user-verification data 124 to obtain metrics results data 312. For example, in some embodiments 720 includes executing the updated query 310 against the user-verification data 124, which includes event messages corresponding to documented uses of the particular user-verification rule 122A by the user-verification service 112, where executing the updated query 310 generates a set of metric data (e.g., metrics results data 312) for the particular user-verification rule 122A. At 722, in the illustrated embodiment, the server system 102 publishes the metrics result data to a data visualization component for display. For example, in some embodiments 722 includes using the data visualization module 118 to populate one or more visualization components with the set of metric data for the particular user-verification rule 122A.

Note that, in various embodiments, the metrics results data 312 may be beneficial for various different purposes, such as providing confidence in the server system 102's compliance with the applicable user-verification rules 122. Additionally, in some embodiments, the metric results data 312 may reveal insights about differences in the user-verification process across jurisdictions (e.g., top countries with electronics and document verification failure rates). In some embodiments, the disclosed techniques may be useful for generating business-driven technical insights for production error's triaging (e.g., assess policies API failure rates for new programs or services implemented by the server system 102) or performing service simulation (e.g., replaying historical requests). Further, in various embodiments, the disclosed techniques may be capable of detecting and reconciling "leakage" (e.g., in instances in which a request is successful without complying with the applicable user-verification rules 122).

Example Computer System

Figure 8:
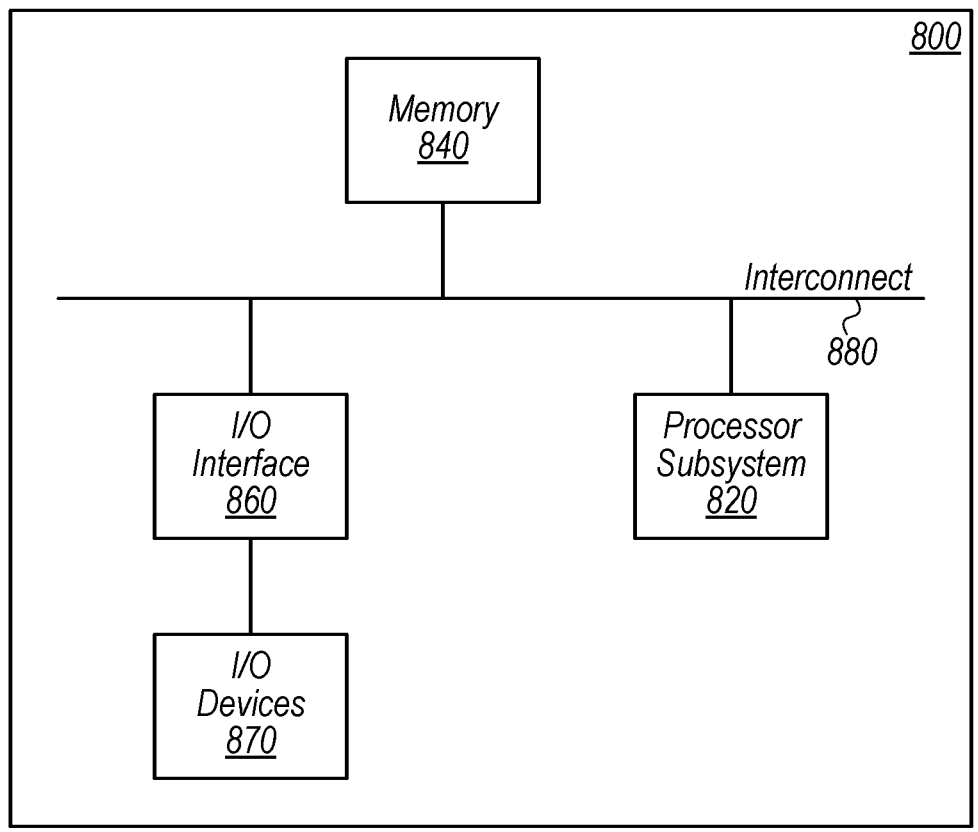
FIG. 8 is a block diagram illustrating an example computer system, according to some embodiments.

Referring now to FIG. 8, a block diagram of an example computer system 800 is depicted, which may implement one or more computer systems, such as client device 130, client device 150, or one or more of the computer systems in server system 102, according to various embodiments. Computer system 800 includes a processor subsystem 820 that is coupled to a system memory 840 and I/O interfaces(s) 860 via an interconnect 880 (e.g., a system bus). I/O interface(s) 860 is coupled to one or more I/O devices 870. Computer system 800 may be any of various types of devices, including, but not limited to, a server computer system, personal computer system, desktop computer, laptop or notebook computer, mainframe computer system, server computer system operating in a datacenter facility, tablet computer, handheld computer, workstation, network computer, etc. Although a single computer system 800 is shown in FIG. 8 for convenience, computer system 800 may also be implemented as two or more computer systems operating together.

Processor subsystem 820 may include one or more processors or processing units. In various embodiments of computer system 800, multiple instances of processor subsystem 820 may be coupled to interconnect 880. In various embodiments, processor subsystem 820 (or each processor unit within 820) may contain a cache or other form of on-board memory.

System memory 840 is usable to store program instructions executable by processor subsystem 820 to cause computer system 800 perform various operations described herein. System memory 840 may be implemented using different physical, non-transitory memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 800 is not limited to primary storage such as system memory 840. Rather, computer system 800 may also include other forms of storage such as cache memory in processor subsystem 820 and secondary storage on I/O devices 870 (e.g., a hard drive, storage array, etc.). In some embodiments, these other forms of storage may also store program instructions executable by processor subsystem 820.

I/O interfaces 860 may be any of various types of interfaces configured to couple to and communicate with other devices, according to various embodiments. In one embodiment, I/O interface 860 is a bridge chip (e.g., Southbridge) from a front-side to one or more back-side buses. I/O interfaces 860 may be coupled to one or more I/O devices 870 via one or more corresponding buses or other interfaces. Examples of I/O devices 870 include storage devices (hard drive, optical drive, removable flash drive, storage array, SAN, or their associated controller), network interface devices (e.g., to a local or wide-area network), or other devices (e.g., graphics, user interface devices, etc.). In one embodiment, I/O devices 870 includes a network interface device (e.g., configured to communicate over WiFi, Bluetooth, Ethernet, etc.), and computer system 800 is coupled to a network via the network interface device.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U. S.C. § 112(f) for that claim element. Should Applicant wish to invoke Section 112(f) during prosecution of a United States patent application based on this disclosure, it will recite claim elements using the "means for" [performing a function] construct.

"In this disclosure, various "modules" operable to perform designated functions are shown in the figures and described in detail (e.g., rule conversion module 202). As used herein, a "module" refers to software or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized ASIC.

What is claimed is:

1. A method for managing updates to user-verification rules and reporting information associated with use of the updated user-verification rules, the method comprising:
    maintaining, by a server system, a set of user-verification rules usable to verify an identity of a user requesting to perform operations via a service provided by the server system, wherein a particular user-verification rule, of the set of user-verification rules, indicates:
        a particular operation of the service with which the particular user-verification rule is associated;
        a first set of user identification information to collect from a given user to satisfy the particular user-verification rule;
    receiving, by the server system, an updated rule definition for the particular user-verification rule, wherein the updated rule definition specifies a second set of user identification information to collect from the given user to satisfy the particular user-verification rule;
    automatically generating, by the server system, an updated schema for the particular user-verification rule based on the updated rule definition, wherein the updated schema specifies a structure of event messages used to document uses of the particular user-verification rule by a, and wherein the updated schema includes a set of fields corresponding to the second set of user identification information;
    determining, by the server system using the updated schema, information corresponding to a particular use of the particular user-verification rule based on a first request, from a first user, to utilize the particular operation of the service;
    and
    generating, by the server system, an event message to document the information corresponding to the particular use of the particular user-verification rule, wherein the event message is formatted according to the updated schema and includes data values for one or more of the set of fields corresponding to the second set of user identification information.

2. The method of claim 1, further comprising:
    generating, by the server system, an updated query for the particular user-verification rule based on the updated rule definition;
    executing, by the server system, the updated query against an event message datastore that includes a plurality of event messages corresponding to documented uses of the particular user-verification rule, wherein the executing the updated query generates a set of metric data for the particular user-verification rule; and
    populating, by the server system, a visualization component with the set of metric data for the particular user-verification rule.

3. The method of claim 2, wherein the generating the updated query includes:
    extracting one or more data values from a metric formula included in a metric definition associated with the particular user-verification rule; and
    inserting the one or more data values into a query template to generate the updated query for the particular user-verification rule.

4. The method of claim 1, further comprising:
   determining, by the server system, that the event message for the particular use of the particular user-verification rule is missing a first data value for a first one of the set of fields corresponding to the second set of user identification information;
   retrieving, by the server system, the first data value for the first field from a set of user data for the first user;
   adding, by the server system, the first data value for the first field to the event message; and
   storing, by the server system, the event message in an event message datastore.

5. The method of claim 1, wherein the updated rule definition for the particular user-verification rule is provided in a first format, wherein the method further comprises:
   converting, by the server system, the particular user-verification rule from the first format to a second, different format, wherein the second, different format is usable to apply the particular user-verification rule for live requests to perform the particular operation via the service provided by the server system.

6. The method of claim 5, wherein the converting includes:
   parsing the updated rule definition for the particular user-verification rule based on a parsing grammar; and
   based on the parsing, converting one or more components of the particular user-verification rule from the first format to the second, different format.

7. The method of claim 5, wherein the updated rule definition is provided via a plurality of graphical input components of a graphical user interface provided by the server system; and wherein the server system includes a user-verification service as part of a know your client ("KYC") service.

8. A non-transitory, computer-readable medium having instructions stored thereon that are executable by a server system to perform operations for managing generation of user-verification rules and reporting information associated with use of the generated user-verification rules, the operations comprising:
   maintaining a set of user-verification rules usable to verify an identity of a user requesting to perform operations via a service provided by the server system, wherein a particular user-verification rule, of the set of user-verification rules, indicates:
      a particular operation of the service with which the particular user-verification rule is associated;
      a first set of user identification information to collect from a given user to satisfy the particular user-verification rule;
   receiving an updated rule definition for the particular user-verification rule, wherein the updated rule definition specifies a second set of user identification information to collect from the given user to satisfy the particular user-verification rule;
   automatically generating an updated schema for the particular user-verification rule based on the updated rule definition, wherein the updated schema specifies a structure of event messages used to document uses of the particular user-verification rule, and wherein the updated schema includes a set of fields corresponding to the second set of user identification information;
   determining, using the updated schema, information corresponding to a particular use of the particular user-verification rule based on a request, from a first user, to utilize the particular operation of the service; and
   generating an event message, according to the updated schema, to document the information corresponding to the particular use of the particular user-verification rule, wherein the event message includes data values for one or more of the set of fields corresponding to the second set of user identification information.

9. The non-transitory, computer-readable medium of claim 8, wherein the operations further comprise:
   generating an updated query for the particular user-verification rule based on the updated rule definition;
   executing the updated query against an event message datastore that includes a plurality of event messages corresponding to documented uses of the particular user-verification rule, wherein the executing the updated query generates a set of metric data for the particular user-verification rule; and
   populating a visualization component with the set of metric data for the particular user-verification rule.

10. The non-transitory, computer-readable medium of claim 9, wherein the generating the updated query includes:
    extracting one or more data values from a metric formula included in a metric definition associated with the particular user-verification rule; and
    inserting the one or more data values into a query template to generate the updated query for the particular user-verification rule.

11. The non-transitory, computer-readable medium of claim 8, wherein the operations further comprise:
    determining that the event message for the particular use of the particular user-verification rule is missing a first data value for a first one of the set of fields corresponding to the second set of user identification information;
    retrieving the first data value for the first field from a set of user data for the first user;
    adding the first data value for the first field to the event message; and
    storing the event message in an event message datastore.

12. The non-transitory, computer-readable medium of claim 8, wherein the updated rule definition for the particular user-verification rule is provided in a first format, wherein the operations further comprise:
    converting the particular user-verification rule from the first format to a second, different format, wherein the second, different format is usable to apply the particular user-verification rule for live requests to perform the particular operation via the service provided by the server system.

13. The non-transitory, computer-readable medium of claim 12, wherein the converting includes:
    parsing the updated rule definition for the particular user-verification rule based on a parsing grammar; and
    based on the parsing, converting one or more components of the particular user-verification rule from the first format to the second, different format.

14. The non-transitory, computer-readable medium of claim 12, wherein the updated rule definition is provided via a plurality of graphical input components of a graphical user interface provided by the server system; and wherein the server system includes a user-verification service in a know your client ("KYC") service provided by the server system.

15. A system configured to update user-verification rules and to report information associated with use of the updated user-verification rules, the system comprising:
    at least one processor;
    a non-transitory, computer-readable medium having instructions stored thereon that are executable by the at least one processor to cause the system to:

maintain a set of user-verification rules usable to verify an identity of a user requesting to perform operations via a service provided by the system, wherein a particular user-verification rule, of the set of user-verification rules, indicates:
    a particular operation of the service with which the particular user-verification rule is associated;
    a first set of user identification information to collect from a given user to satisfy the particular user-verification rule;
receive an updated rule definition for the particular user-verification rule, wherein the updated rule definition specifies a second set of user identification information to collect from the given user to satisfy the particular user-verification rule;
automatically generate an updated schema for the particular user-verification rule based on the updated rule definition, wherein the updated schema specifies a structure of event messages used to document uses of the particular user-verification rule, and wherein the updated schema includes a set of fields corresponding to the second set of user identification information;
identifying, using the updated schema, information corresponding to a particular use of the particular user-verification rule based on a request, from a first user, to utilize the particular operation of the service; and
generate an event message, according to the updated schema, to document the information corresponding to the particular use of the particular user-verification rule, wherein the event message includes data values for one or more of the set of fields corresponding to the second set of user identification information.

16. The system of claim 15, wherein the instructions are further executable to cause the system to:
    generate an updated query for the particular user-verification rule based on the updated rule definition;
    execute the updated query against an event message datastore that includes a plurality of event messages corresponding to documented uses of the particular user-verification rule, wherein executing the updated query generates a set of metric data for the particular user-verification rule; and
    populate a visualization component with the set of metric data for the particular user-verification rule.

17. The system of claim 16, wherein generating the updated query includes:
    extracting one or more data values from a metric formula included in a metric definition associated with the particular user-verification rule; and
    inserting the one or more data values into a query template to generate the updated query for the particular user-verification rule.

18. The system of claim 15, wherein the instructions are further executable to cause the system to:
    determine that the event message for the particular use of the particular user-verification rule is missing a first data value for a first one of the set of fields corresponding to the second set of user identification information;
    retrieve the first data value for the first field from a set of user data for the first user;
    add the first data value for the first field to the event message; and
    store the event message in an event message datastore.

19. The system of claim 15, wherein the updated rule definition for the particular user-verification rule is provided in a first format, wherein the instructions are further executable to cause the system to:
    convert the particular user-verification rule from the first format to a second, different format, wherein the second, different format is usable to apply the particular user-verification rule for live requests to perform the particular operation via the service provided by the system.

20. The system of claim 19, wherein converting the particular user-verification rule includes:
    parsing the updated rule definition for the particular user-verification rule based on a parsing grammar; and
    based on the parsing, converting one or more components of the particular user-verification rule from the first format to the second, different format.

\* \* \* \* \*